A. E. CANFIELD.

ANTISKIDDING DEVICE FOR WHEEL TIRES.

APPLICATION FILED NOV. 14, 1917.

Reissued Jan. 29, 1918. 14,427.

Witnesses
H. F. Keith,
Chas. P. Gulbe

Inventor
A. E. Canfield.
By A. Randolph Jr.
Attorney

UNITED STATES PATENT OFFICE.

ALBERT ELIAS CANFIELD, OF KINGSTON, PENNSYLVANIA, ASSIGNOR OF THREE-FIFTHS TO GEORGE M. PACE, OF KINGSTON, PENNSYLVANIA.

ANTISKIDDING DEVICE FOR WHEEL-TIRES.

14,427. Specification of Reissued Letters Patent. Reissued Jan. 29, 1918.

Original No. 1,233,978, dated July 17, 1917, Serial No. 91,927, filed April 18, 1916. Application for reissue filed November 14, 1917. Serial No. 202,092.

*To all whom it may concern:*

Be it known that I, ALBERT E. CANFIELD, a citizen of the United States, residing at Kingston, in the county of Luzerne and State of Pennsylvania, have invented certain new and useful Improvements in Anti-skidding Devices for Wheel-Tires; and I do hereby declare the following to be a full, clear, and exact description of the invention, such as will enable others skilled in the art to which it appertains to make and use the same.

This invention has for its object to provide a novel type of anti-skidding device for vehicle wheels equipped with either cushion or pneumatic tires, and which includes a plurality of gripping or anti-skidding chains embracing the wheel tire and rim and supported in position thereon by a single side chain.

Another object is the provision of an anti-skidding device for vehicle wheels including a plurality of pairs of gripping chains, the chains of each pair being extended divergently over the tread of the tire in spaced relation and adjustably connected at their free ends to the retaining or side chain.

With these and other objects in view, the invention consists in the novel construction, combination and arrangement of parts as will be hereinafter specifically described, claimed and illustrated in the accompanying drawing, in which:

Figure 1:
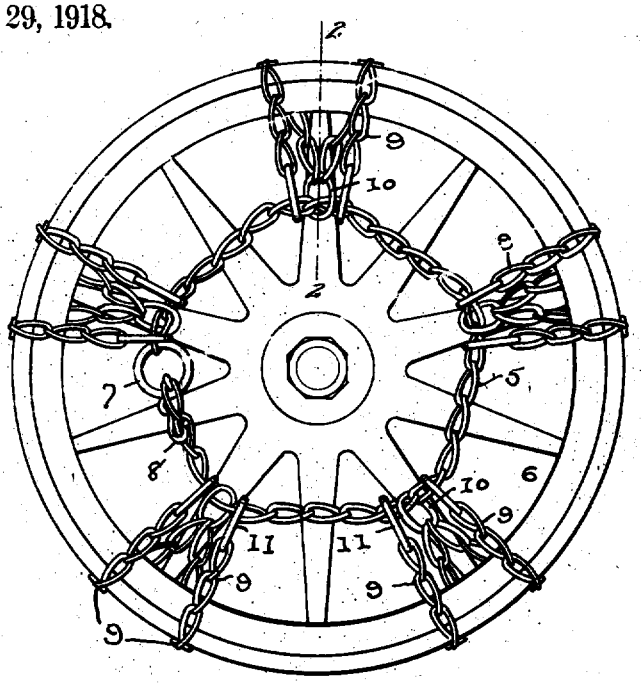
Figure 1 represents a side elevation of the improved anti-skidding device.
Figure 2:
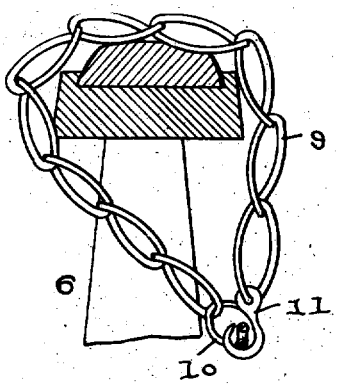
Fig. 2 represents a transverse sectional view on the line 2—2 of Fig. 1.

Referring to the drawing in detail, wherein similar reference numerals designate corresponding parts throughout the several views, the numeral 5 indicates the side or retaining chain of the anti-skidding device, which is of considerably less length than the circumference of the wheel 6 to which it is to be applied. A ring 7 is permanently connected with one end of the side chain 5 and the opposite end thereof, which is positioned through the ring 7, is provided with a hook 8, adapted, when the chain is passed through the loop 7 and turned back, to engage one of the links adjacent the end of the chain to adjustably connect the ends thereof.

Each of the anti-skidding or gripping elements includes a pair of relatively short chains 9 permanently connected at one end by a ring 10 of such internal diameter as to be freely movable longitudinally upon the side chain 5. The opposite ends of the gripping chains 9 are equipped with hooks 11 of such size and shape as to engage the links of the side chain 5.

In applying the anti-skidding device to the vehicle wheel, the free ends of the side chain 5 are connected, in the manner illustrated in Fig. 1, and said chain is arranged upon one side of the vehicle wheel 6, preferably upon the outside thereof. The rings 10 are subsequently adjusted longitudinally of the side chain 5 and the gripping or anti-skidding chains 9 are clamped under the wheel rim, across the tread of the tire and are fastened in position by engaging the hooks 11 thereof with the links of the side chain 5. From the rings 10 to the tread of the vehicle tire, the chains 9 are preferably extended divergently, so as to space the portions of said chains which embrace the tread surface of the tire and thus render the anti-skidding device more effective in use.

What I claim is:

The combination with a wheel including spokes and a felly having a tire thereon, of a retaining chain of less circumference than the wheel, and adapted to extend circumferentially of said wheel, and upon one side thereof, gripping chains having one of their ends secured to the retaining chain and arranged in pairs, the gripping chains of each pair adapted to extend upon each side of the spokes from one side of the wheel and about the tire to the other side of the wheel, hooks secured to the free ends of the gripping chains and to the retaining chain upon each side of the connection of the other ends of said gripping chains to the retaining chain, and means for adjustably securing the ends of the retaining chain together.

In testimony whereof I affix my signature in presence of two witnesses.

ALBERT ELIAS CANFIELD.

Witnesses:
ARTHUR W. HELFRICH,
M. F. GROVER.